Patented Mar. 8, 1938

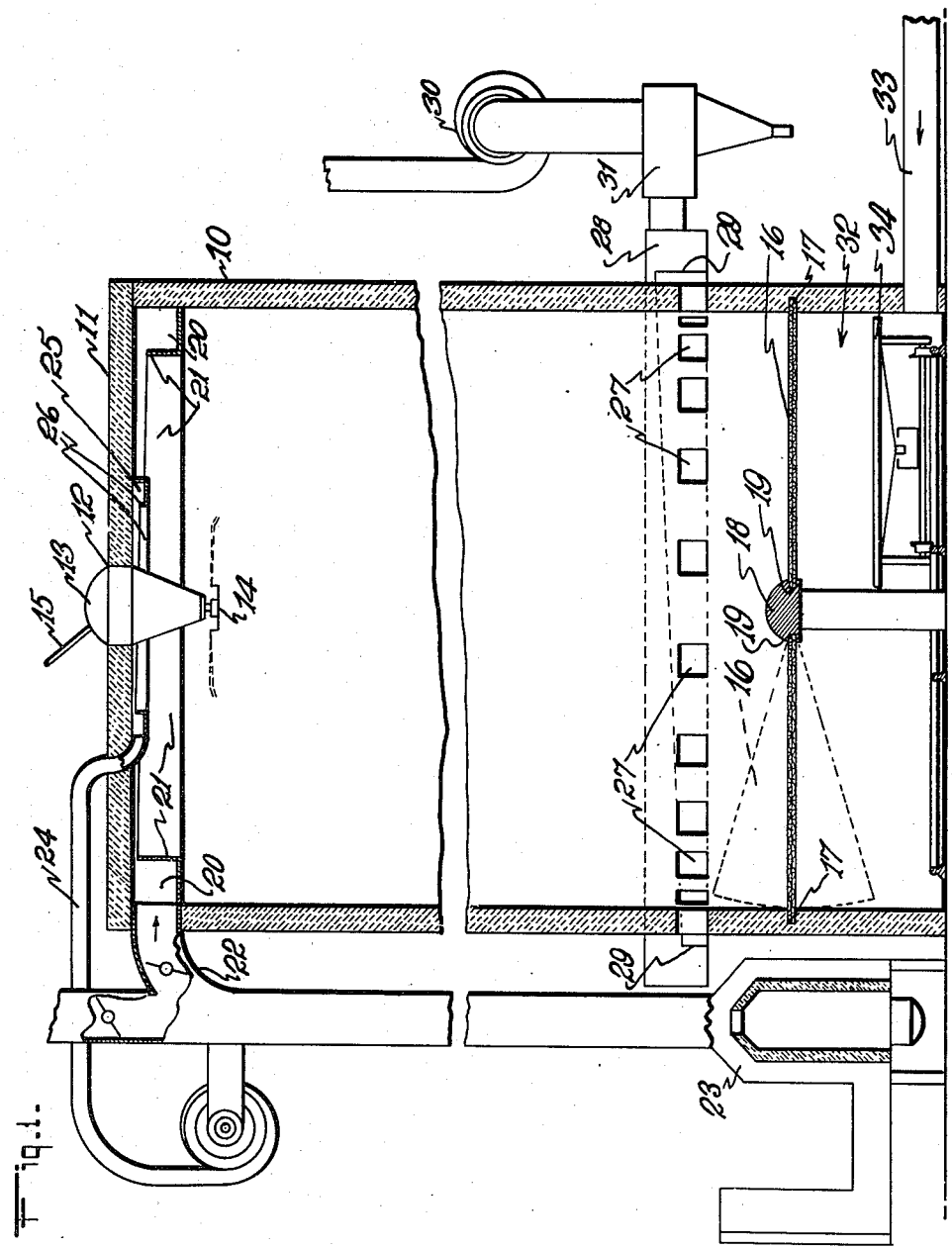

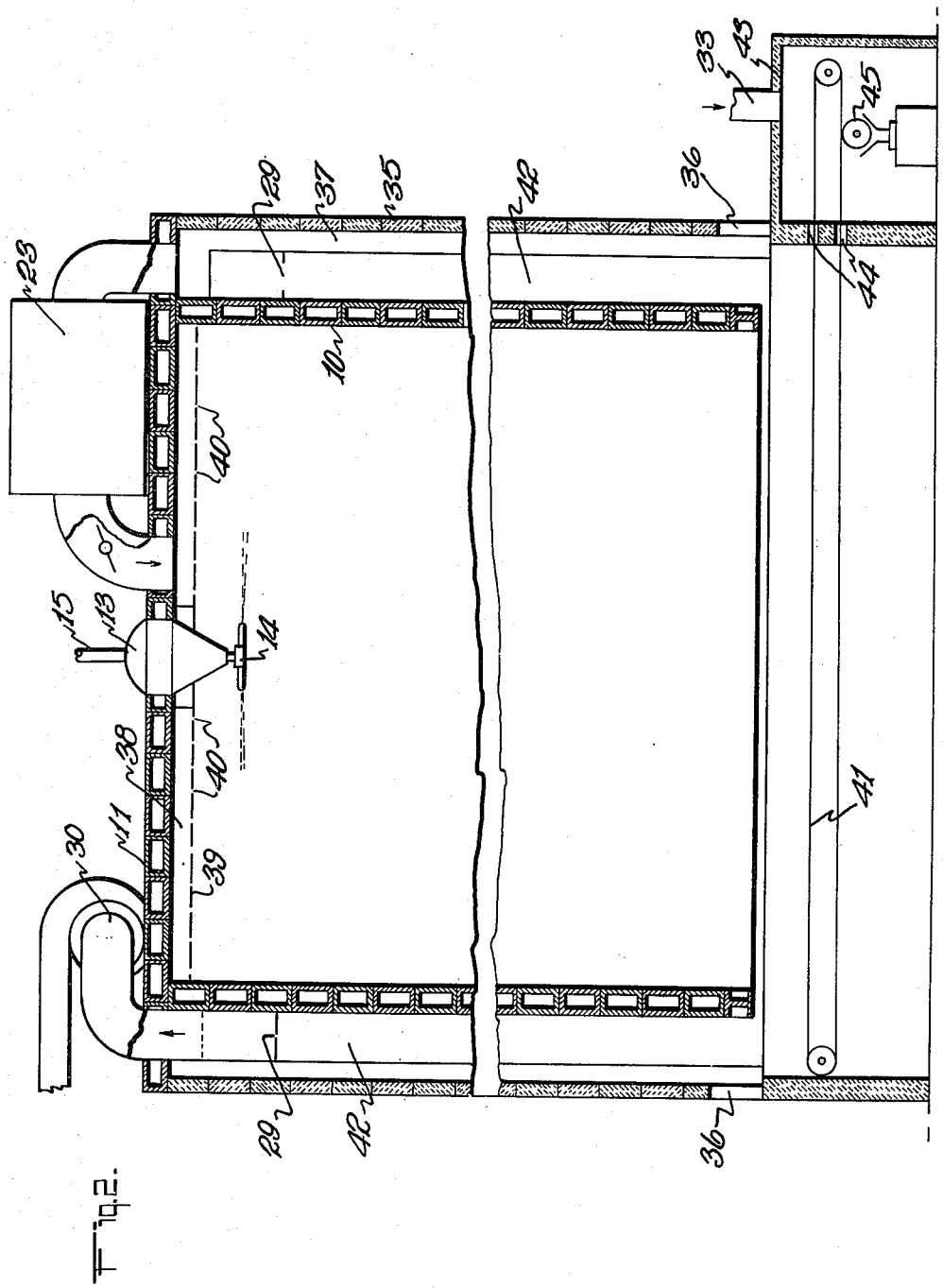

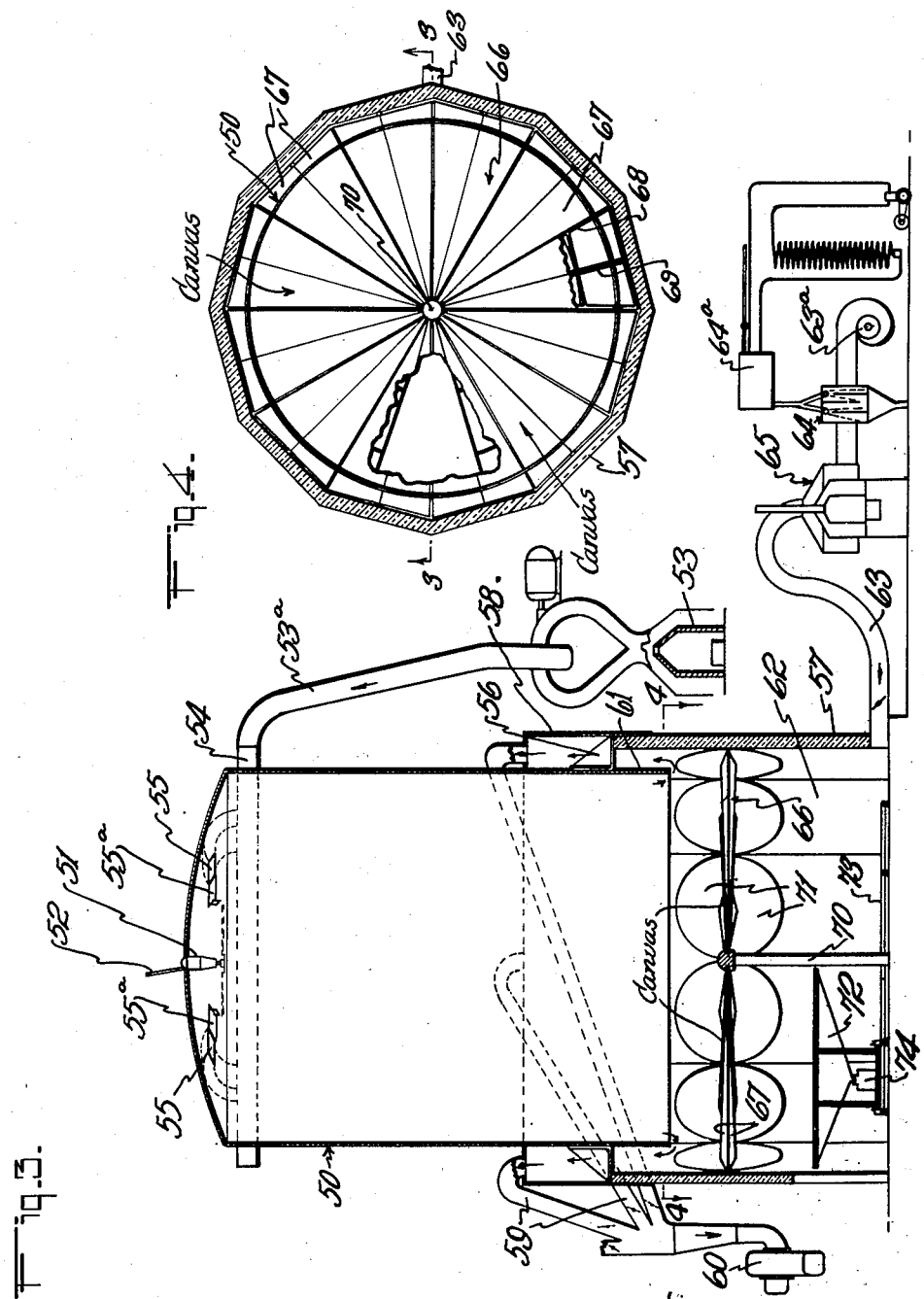

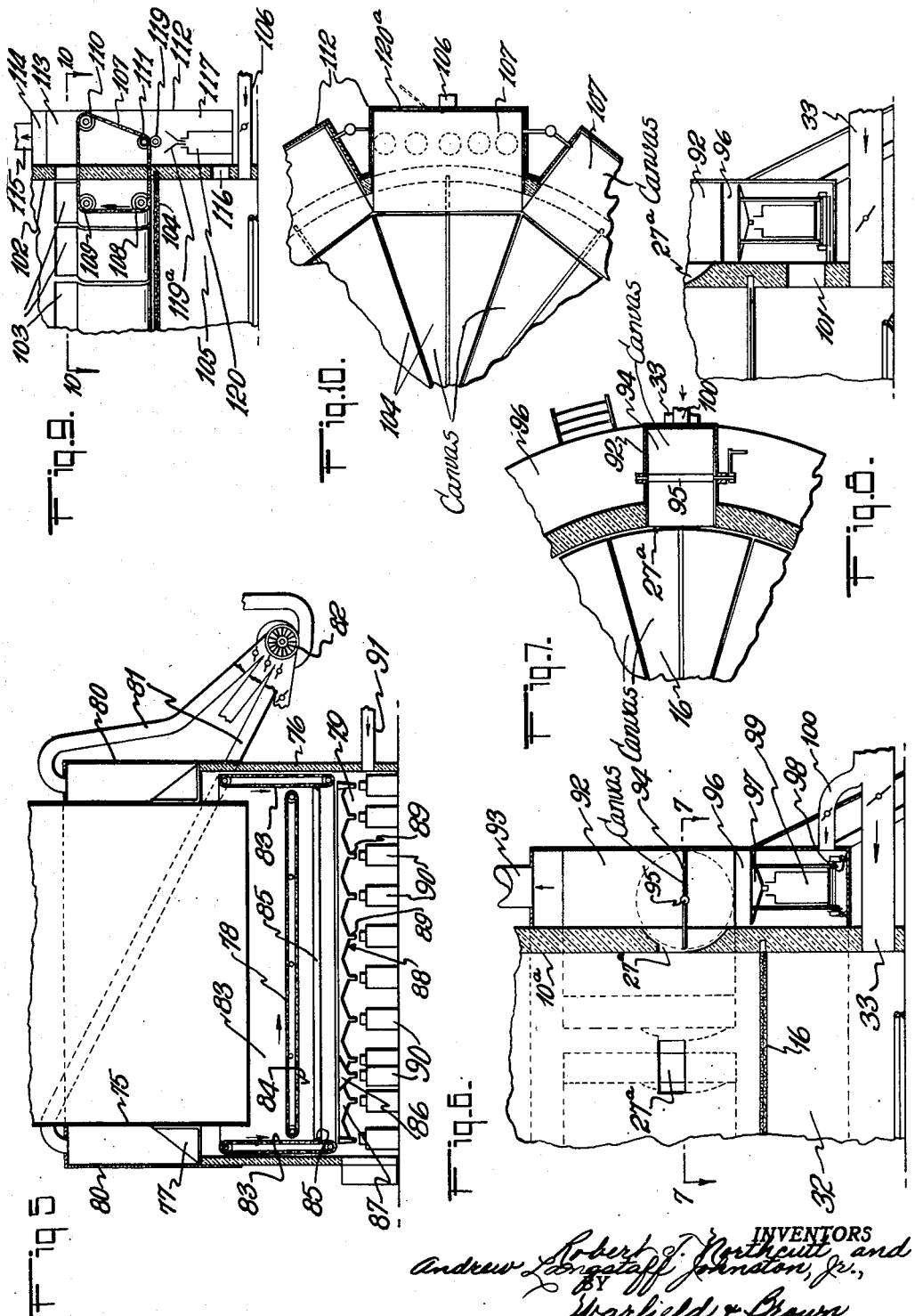

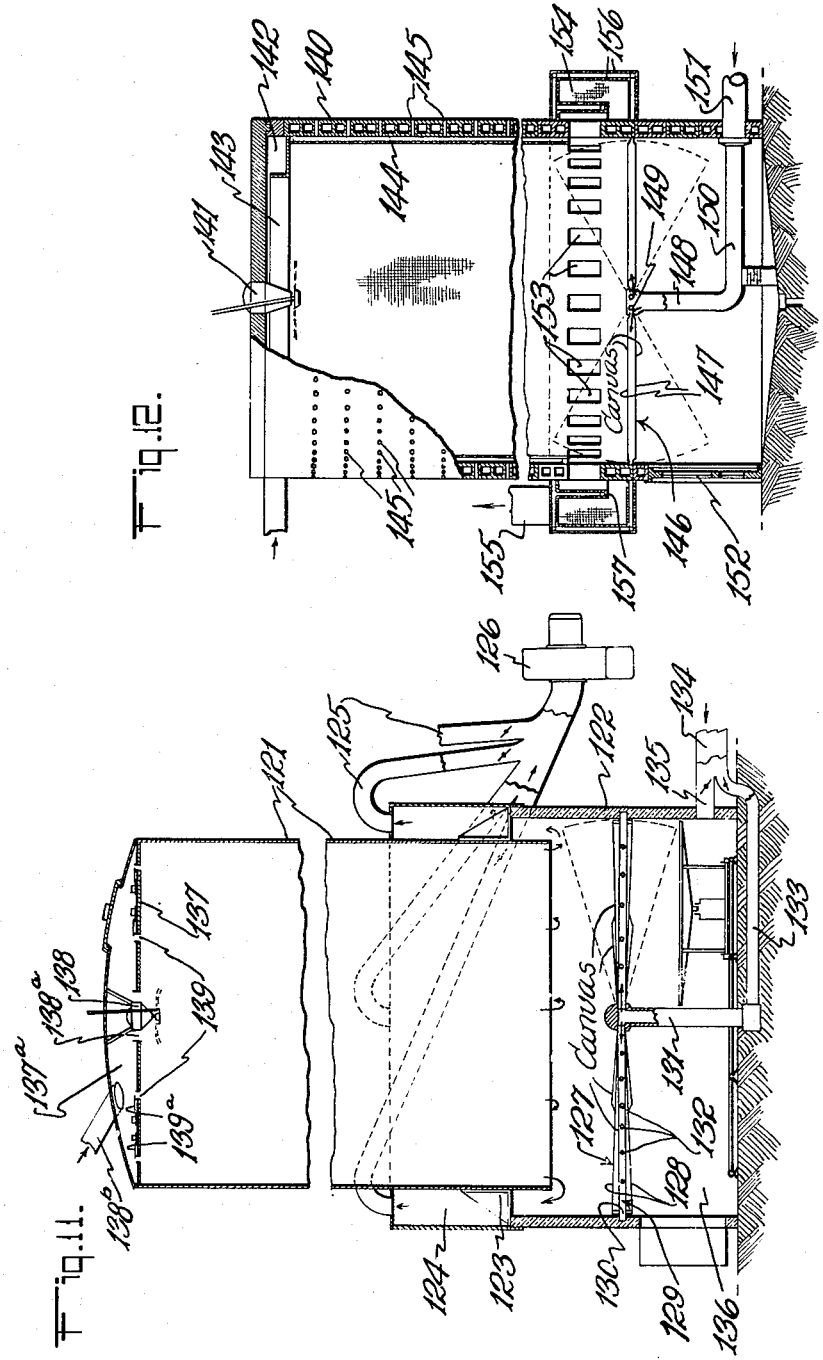

2,110,167

UNITED STATES PATENT OFFICE 2,110,167

SPRAY DRYING APPARATUS

Robert T. Northcutt, Cranford, and Andrew Langstaff Johnston, Jr., Plainfield, N. J., assignors to Food Concentrates, Inc., New York, N. Y., a corporation of Delaware Application December 2, 1933, Serial No. 700,691
Renewed October 15, 1937

20 Claims. (Cl. 159—4)

This invention relates to a spray-drying apparatus.

An object of the invention is the provision of improved apparatus wherein and whereby materials which were not considered susceptible to efficient and/or effective spray-drying may be satisfactorily dried Another object of the invention is the provision of drying apparatus whereby difficult materials may be efficiently reduced to powder form without grinding.

A further object is the provision of apparatus of the character under consideration which will produce a satisfactory powder in an amount bearing a high proportion to the amount of solids present in the liquid sprayed.

An additional object is the provision of apparatus of the character under consideration which is efficient and economical to construct and operate.

Other objects of the invention will in part be obvious and will in part appear hereinafter.

This application is a continuation in part of our copending applications, Serial No. 478,660, filed August 29, 1930, and Serial No. 572,812, filed November 3, 1931, which, respectively, have issued as Patents 1,958,702, and 1,959,301, both dated May 15, 1934.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Figure 1 is a view partly in section and partly in elevation showing one form of drying apparatus embodying the invention;

Fig. 2 is a similar view of another form of apparatus;

Fig. 3 is a similar view on a smaller scale showing still another form;

Fig. 4 is a transverse sectional view taken along the line 4—4 in Fig. 3;

Fig. 5 is a vertical sectional view showing the lower portion of another form of apparatus embodying the invention;

Fig. 6 is a partial vertical section showing a modification of the apparatus shown in Fig. 1;

Fig. 7 is a transverse sectional view taken along the line 7—7 in Fig. 6;

Fig. 8 is a view similar to Fig. 6 illustrating a further modification;

Fig. 9 is a vertical section showing a modified form;

Fig. 10 is a transverse sectional view taken along the line 10—10 in Fig. 9;

Fig. 11 is a vertical sectional view showing another form of apparatus; and

Fig. 12 is a similar view showing still another form.

The drying of material containing large quantities of sugar or of other material which is rendered plastic by fairly low heats and is of a hydroscopic nature presents problems of a unique nature. Such materials can not be successfully dried by the ordinary type of spray towers which are utilized—often with high efficiency—in the drying of other types of materials. Attempts to dry comminuted bananas, sugar syrups, and like materials, in ordinary spray towers, result in an undue scorching or caramelization of the product, and/or in the production of a product which contains so much moisture that it is little more than a sticky mass, and/or in the production of a plastic mass which, when cooled, cannot be reduced to a powdered form without grinding.

In the embodiment of the invention hereinafter described an apparatus is disclosed wherein comminuted carbohydrate material rich in fruit sugars or other hygroscopic substances, such, for example, as the comminuted pulp of dead ripe bananas, ripe peaches, molasses, etc., may be rapidly and continuously dried, removed, and packaged economically without charring or burning the material, without scraping the material, or in any way packing it together or causing it to adhere, and without regrinding the dried powder.

The invention contemplates an apparatus adapted to pass the comminuted carbohydrate material from a relatively intensely heated drying atmosphere to an atmosphere of normal temperature, but always under such controlled humidity conditions that the powdered carbohydrate material is never permitted to become wet. By means of this apparatus, a stream of comminuted carbohydrate material rich in hygroscopic fruit sugars may be continuously fed into the drying chamber and the dry powdered material continuously removed from the chamber and packaged. Not only is the process of this invention capable of continuous operation and hence of great commercial advantage, but the product, the dry fruit powder, retains in a concentrated form the aroma and flavor of the original fruit, and hence is admirably adapted as a base for flavorings, sauces, etc.

In the embodiment of the invention shown, comminuted sugar-containing carbohydrate material such as molasses or the product obtained by finely grinding the pulp of ripe fruits, such as peaches or bananas, or by squeezing the juice from fruits such as oranges or grapes, or other material, may be introduced into the drying chamber by spraying and caused to pass immediately through a relatively highly heated zone of circulated air or other drying gaseous medium. The finely divided material is thereafter collected at the bottom of the chamber in a zone where the temperature has been sufficiently reduced to prevent scorching or caramelizing of the sugar content. This is preferably accomplished by removing the heated gases from the chamber at a point sufficiently above the place of deposit of the dry material so that the accumulated material is not subjected to the direct scorching action of the hot gases. It is advisable to maintain the temperature of the gases adjacent the deposit floor at such a point that their relative humidity is such that the deposited material will not become wet. In drying, the gases take up from the sprayed material a considerable amount of moisture before the material is deposited, and they must therefore be maintained at a relatively high temperature. It has been found that the temperature of the gases adjacent the deposit floor should preferably be maintained at a point somewhat above the temperature at which the sugar content of the dry material becomes soft and plastic. Hence the condition of the material on the deposit floor is ordinarily such that the individually dried particles are slightly adherent because of the relatively high temperatures of the gases adjacent thereto, even though the material itself is not wet.

The invention contemplates the provision of apparatus adapted for the transfer of the deposited material from this deposit zone of relatively high heat to a zone having a temperature such that the sugar content of the material will be cooled to hardness. This cooling zone has also, preferably, an atmosphere of such controlled humidity that the dry comminuted powder will not tend to absorb any moisture. The transfer of the deposited powder from the relatively hot zone at the base of the drying chamber to the cooler zone is preferably accomplished without disturbing the lie of the powder, for it has been found that if the warm, slightly adhering powder in the base of the chamber is lumped or scraped together, it has a tendency to adhere closely and to resist all efforts to break it again into finely comminuted particles without grinding.

After the powder has been adequately cooled it may be packaged in air-tight containers, still under such conditions of controlled humidity that the powder has no tendency to absorb moisture and become wet or sticky.

In the embodiments of the invention shown in Figs. 1 and 2, 10 denotes a main cylindrical wall forming a drying tower which may be of any desired height and width, for example 32 feet high and 22 feet in diameter, and which may be constructed of any suitable material, for example hollow tiling. The cylindrical wall when built to a desired height may be roofed over in any convenient manner, for example, by means of a reinforced concrete slab 11 which has a central opening 12. In this opening is disposed a motor 13 or other driving means which actuates a spray head 14 which sprays the material to be dried across the upper portion of the tower. A conduit 15 is provided entering the roof 11 adjacent to the motor 13 and arranged to supply the comminuted material directly to the spray head 14 whereby the same is thrown centrifugally outward across the upper portion of the tower. The material then falls in the form of a mist or fine snow through the chamber.

The bottom of the heating chamber is of a construction which permits the deposited material to be transferred from the heated zone in the tower to a cooler chamber beneath the tower without disturbing its lie. In the embodiment of the invention shown in Fig. 1 the bottom of the heating chamber is composed of a plurality of rotatable sectors 16 of any convenient size which are disposed side by side so as to form a continuous bottom. Each sector thus formed is pivoted to the wall of the tower at its outer center point as indicated at 17, and at its inner central point to a central supporting member 18 as indicated at 19.

The pivoted sectors are positioned at a proper distance beneath the hot air exhaust openings in the wall of the drying chamber, for example, 6 feet in an apparatus of the type herein described, the apparatus will function and the process may be performed without danger of charring or burning the dry material even though the sectors be made of a non-porous substance, for example, sheet metal.

The gaseous drying medium is preferably introduced into the drying chamber at the top. To this end an annular duct 20 is shown as disposed about the wall 10 at the top and has its inner side wall 21 cut short so as not to extend fully up against the top 11, whereby there are provided one or more annular spaces between the edge of wall 21 and the ceiling of the chamber through which the drying medium enters. A supply duct 22 is arranged to pass through the wall 10 and communicate with the duct 20 at a convenient point. The annular space between the ceiling 11 and the inner edge 21 of the duct 20 is preferably smallest at the point of entry of the supply duct 22 and largest at a point on the wall of the drying chamber directly opposite, so that a substantially uniform supply of the drying medium is furnished at all points around the circumference of the upper portion of the chamber wall. The drying medium introduced by the supply duct is drawn from any convenient source, for example, from a heating furnace 23 which pre-heats the medium to the desired temperature. Intermediate the heating furnace 23 and the entry of the duct 22 into the wall 10 of the chamber, a supplemental duct 24 may be provided adapted to take some of the pre-heated drying medium and divert it so that it may enter the drying chamber through the duct 25 which is positioned about the motor 13 and which is provided with an inner edge 26 which fails to make contact with the roof 11 so that a supply of the heated drying medium is furnished to the center of the upper portion of the tower and flows down upon the comminuted material immediately after it leaves the spray head 14. With the use of the supplemental duct 24 and its associated parts, eddies which normally arise in the sprayed mist and which tend to cause the sprayed material to become deposited upon the roof of the drying chamber, are broken up and substantially all the material is caused to float downward slowly through the chamber.

An exhaust for the heating gases is provided, and in the embodiment of the invention shown in Fig. 1 comprises a plurality of openings 27 in the wall of the drying chamber. These openings may be formed by the omission at regular intervals about the chamber wall of one or more tiles. Surounding these exhaust openings 27 is an exhaust duct 28 which may be provided along the edge adjacent the openings in the chamber wall with a baffle 29, which acts not only to prevent the sprayed material from being drawn into the exhaust duct, but also to regulate the strength of the exhaust at different portions on the circumference of the chamber wall. This baffle is preferably largest at that portion of the exhaust duct which is directly connected to the exhaust fan 30, and preferably smallest at that point in the exhaust duct which is directly opposite said connection, so that an equal amount of the heated gases may be withdrawn through each of the exhaust ports 27. Intermediate the exhaust duct 28 and the exhaust fan 30, a dust-collector 31 may be provided to salvage such of the dried material as may have passed the baffle 29.

In the embodiment of the invention shown in Fig. 1 the cooling chamber 32 into which the dry material is conveyed after it has been deposited upon the floor of the drying chamber is shown as positioned within the walls of the drying tower and directly beneath the sectors 16 which comprise the deposit floor of the tower. This cooling chamber is preferably connected through the duct 33 with a device for conditioning and dehumidifying air, such as shown in Fig. 3 and air at a temperature below the point at which the sprayed material softens is conveyed thereby into the chamber 32 in such quantities and under such humidity conditions that the atmosphere of that chamber is kept at a temperature which will cause the heated comminuted material deposited upon the sectors 16 to cool to a point where it may be shaken readily from the inverted sectors into a receiving tray or carriage 34, which may be mounted upon rails and thus readily move beneath any sector from which the material is to be removed. The drying material, after having been collected in the tray 34, may be removed to a chamber, not shown, where atmospheric conditions are kept at such relative humidity that the material will not become wet or sticky, and there sealed in air-tight containers.

In using the apparatus of the invention most satisfactory results are obtained by first determining the maximum temperature to which the dried comminuted fruit powder will be subjected in commercial handling. For ordinary shipments in the United States a temperature of 110° F. may be arbitrarily selected. That moisture content of the dried fruit powder which will cause caking and hardening of the powder at the maximum temperature of commercial handling should then be determined. For example, with a dry powder made from the pulp of ripe bananas a moisture content in excess of 2.5% causes the powdered banana pulp to cake and harden at a temperature of about 115° F. The moisture content of such a product should, therefore, be fixed at not greater than 2.5% if it is to be handled without caking at temperatures not exceeding 110° F.

Having determined the maxium moisture content permissible in the dried powder a drying gas should be used in the chamber in such quantity and with such entering temperature as to insure that the powder sprayed through the chamber will be dried to the desired point. For example, in a drying tower of 7500 cubic feet capacity, the use of 7500 cu. ft. per minute of a drying medium, as, for example, air, preheated so as to have a temperature at the point of inlet of from 450° to 500° F., will adequately dry comminuted banana pulp sprayed into the top of the tower at the rate of approximately 20 lbs. per minute. Under such conditions the upper tower temperature will run in the neighborhood of from 325° to 350° F., and the temperature of the exhaust gases at the outlet will approximate 200° F. As the dried powder is deposited upon the tower bottom an appreciable distance below the outlet, the temperature at the point of deposit will be considerably below that of the exhaust gases and may approximate 140° F. at which temperature the deposited material shows no tendency to scorch.

As the drying medium takes up a considerable quantity of water from the comminuted carbohydrate material in the tower, the relative humidity of the hot gases at or near the point of deposit of the material is found to approach 35% under the conditions outlined above. Any attempt to reduce the temperature at the point of deposit of the dried material causes an increase in the percentage of relative humidity of the gases at that point. As it has been found that a relative humidity in excess of 35% causes the dried banana powder to take up moisture, it is highly desirable that the temperature of the gases directly over the deposit floor be maintained at such a point that their relative humidity does not exceed 35%.

At this temperature, i. e., approximately 140° F., the sugars in the dried material are soft and plastic and if the material is disturbed it will pack tightly and stick to any instrument used to remove it. The densely-packed and closely-adhering masses which are formed if the lie of the powder is disturbed, can not be readily broken up without grinding.

The invention permits the ready transfer of the dried material from the heated atmosphere at the base of the tower to a cooler atmosphere, where it may be cooled below the point of stickiness of the sugar content under such controlled humidity conditions that the product takes up no more moisture.

This is accomplished in the embodiment of the invention shown in Fig. 1 by rotating the segments of the tower floor so that what was the floor of the tower before rotation becomes the roof of the chamber beneath the tower. As has been pointed out above, the process indicated has been calculated to produce a powder which will contain not more than 2.5% of moisture at a temperature of 110° F. and which will, therefore, crumble into a dry, fluffy, non-adhering powder at or below that temperature. Accordingly, in following out the process described above, with the pulp of ripe bananas as the material processed, the atmospheric conditions in the chamber below the tower should be so maintained that the temperature in this chamber is less than 110° F. and the relative humidity less than 35%, for when the relative humidity is maintained below 35% the powdered banana pulp does not take up moisture at any temperature.

These conditions are accomplished in the embodiment of the invention shown in Fig. 1 by supplying to the chamber beneath the tower a conditioned, de-humidified supply of air. For convenience in gathering and packing the material, the temperature of this air supply may be maintained at or about 90° F. and its relative humidity is preferably kept below 35% for safety. It has been found that in a chamber where such conditions are maintained, the deposited material will cool and become fluffy in a relatively short time. It will remain in place upon the ceiling of the chamber until it is shaken therefrom into a receiving tray. The time for drying and removing the material from the chamber is considerably less than that employed in accumulating an adequate deposit upon the new surface of the chamber floor, formed by the rotation of the sectors of the floor.

After the material has been removed from the ceiling of the cooling chamber, it may be taken to a packaging room, not shown, where it may be sifted and packaged in air-tight containers under such controlled humidity conditions that the relative humidity does not exceed 35% and the temperature does not exceed 110° F., the predetermined maximum temperature of handling. When these conditions are maintained, the packaged product will continue dry and non-adhering at all temperatures below 110° F. Should that temperature be reached and exceeded, the packaged powder may temporarily become sticky and adherent, but when a temperature less than 110° F. is again reached, the powder can be easily broken up into finely-divided particles.

A modified form of apparatus adapted to perform the process of the invention is shown in Fig. 2. In the embodiment of the invention there shown the drying tower is provided with an inner wall 10 and an outer wall 35. The outer wall 35 is provided around its periphery at any suitable points with inlets or openings 36 through which air is drawn into a cylindrical duct 37 which extends substantially the entire height of the tower immediately within the outer wall 35. From this duct the air is drawn through an air-conditioning and heating unit 23 and then fed into a shallow chamber 38 immediately beneath the roof 11 of the drying chamber. This shallow chamber against the roof of the drying chamber is formed by a plate 39 having a multitude of outlets 40 so positioned and arranged that the hot drying gases are fed downwardly into the sprayed material over substantially the whole area of the roof of the chamber.

The inner wall 10 of the chamber preferably terminates, save for suitable supports, at a height from four to five feet above a movable endless belt 41 so positioned beneath the walls 10 of the chamber that all of the dried powder will fall upon some portion of the belt. Between the inner wall 10 of the chamber and the air duct 37, an outlet air duct 42, cylindrical in shape and extending substantially the full height of the chamber, is provided. This duct is preferably considerably larger in size than the inlet duct 37, so that the speed of passage of the exhaust gases around the bottom of the wall 10 and through the duct 42 will be slow and considerably less than the speed of the unconditioned gases taken in through the vents 36. With such a construction, it is found that the exhaust gases do not carry with them into the exhaust duct 42 any of the dried powder.

It is important that the belt 41 upon which the powder is deposited be positioned a sufficient distance below the bottom of the wall 10 of the chamber so that the hot exhaust gases will not be drawn into close contact with the material on the belt, and so that the temperature of the gases contacting with the material on the belt will not be sufficiently high to scorch or char it. The exhaust gases passing between the wall 10 of the chamber and the intake duct 37 aid, by pre-heating the unconditioned air taken in through the vents 36, in increasing the efficiency of the apparatus.

Adjacent the base of the tower, a cooling and packaging chamber 43 is provided. The endless belt 41 is preferably constantly moving in the direction shown by the arrows in Fig. 2 so that the material deposited upon it will be carried from beneath the drying chamber into the cooling and packaging chamber 43. The belt preferably passes through a narrow opening 44 between the tower and the cooling chamber. This opening should be kept as small as possible in order to prevent any hot gases from passing into the cooling chamber with the dried material, and to insure against such event the cooling chamber should be provided with an atmosphere at slightly greater pressure than that adjacent the opening 44 in the drying chamber, so that there will be a tendency for air to flow from the cooling chamber through the opening 44 into the drying chamber and out with the exhaust gases. Suitable means may be provided as at 45 in the cooling chamber for scraping the dried and cooled material from the traveling belt 41 and gathering it in suitable containers. The material may be packaged in air-tight containers within the chamber 43, which should be provided through the duct 33 with an adequate supply of conditioned air at a temperature which will permit workmen to package the material without discomfort and with such relatively humidity that the dried powder will not become wet.

The form of drying tower shown in Fig. 2 is operated substantially as is the form shown in Fig. 1. The ground or comminuted material, such as banana pulp, is fed in at the top of the chamber and sprayed uniformly across the chamber by means of the spray head. The material then falls through the heated atmosphere that is supplied through the inlet ducts and floats downwardly, being deposited upon the floor formed by the belt 41. The heated gases are drawn off through the walls of the tower at a point appreciably above the level of the deposit flood and the dried material is withdrawn by movement of the belt from within the tower to a cooling room where it may be packaged as desired.

The form of apparatus illustrated in Fig. 3 comprises a drying tower 50 into the top of which the material to be dried is sprayed in liquid form, as by means of a centrifugal device 51 through which the material is fed through a pipe 52. The tower may be made especially wide as indicated to lessen the likelihood of the ejected particles reaching to side walls. Suitably conditioned air is fed from a heater 53 through one or more pipes to the top of the tower. In the present instance hot gas is carried by a pipe 53a to an annular conduit 54 and thence to openings 55 in the sides of the tower. Valves 55a may be provided for controlling the flow through these openings. The tower proper is supported by means of brackets 56 upon a polygonal base 57, which is wider than the tower. The mean diameter of this base may be three or four feet greater than the diameter of the drying tower 50. The space above the polygonal base 57 is closed by a casing member 58 from the upper portion of which a plurality of pipes 59 lead to a suction device 60, whereby the hot gas which has taken up the moisture from the material may be exhausted from the tower. The tower preferably extends downwardly several feet below the top of the polygonal base 57, as indicated at 61, so as to minimize any tendency of particles to follow the air and to be deposited on the brackets 56.

Within the polygonal base there is provided a cooling chamber 62 into which gas, having a temperature low enough to harden the deposited particles and a relative humidity such that the material will not take up moisture, is introduced through a pipe 63 from a blower 63a. In order to suitably condition this gas there may be provided a suitable dehumidifying apparatus which may include a spray of water 64 from a chilling unit 64a, and a warming device 65 whereby the relative humidity of the air is reduced. The deposit floor, in the present instance, is provided by a plurality of reversible sectors 66 each comprising upper and lower sheets 67 of canvas supported on suitable frame-work 68 and pivoted on rods 69 extending between a central post 70 and the polygonal base 57. While canvas has been found a particularly desirable material for the formation of the deposit floor members, it is to be understood that the invention in its broader aspects contemplates the use of deposit floor units composed of any of a variety of materials including metal sheets.

Inasmuch as the movement of the exhaust gases past the lower end of the tower 50 will have some tendency to cause some of the particles to swerve outwardly, it is desirable to provide means for receiving a considerable number of such particles as would tend to contact with the wall of the polygonal member 57, and, because of their sticky condition, to remain thereagainst. To this end each of the sectors 66 is provided at its outer end with upwardly and downwardly extending flaps 71, one of which will operate regardless of the position of the sector to catch material above the outer end of the sector and for a considerable period upwardly. Desirably, in order to permit easy movement of the sectors in either direction these flaps are semi-circular in shape. While the flaps do not cover the entire periphery of the polygonal walls between the base of the tower and the top of the sectors they will cover substantially all of that portion of the wall immediately above the sectors where, due to spreading tendency, there is the greatest likelihood for the particles to collect on the wall, and will cover a fair amount of the upper portion of the wall where there is less likelihood of the material to be deposited. If desired, the more distant portion of the flaps may be omitted altogether.

In operation a sector is turned over after a suitable quantity of banana powder, powdered syrup, or other material has been deposited. The deposited material, while retaining its individual particle form, will be sticky and coherent to a high degree. Upon exposure to the dry cooling atmosphere beneath the floor the particles will begin to harden. When the particles nearest the canvas have become hardened a receiving table 72 may be rolled on a track 73 to a position under the sector and hardened material knocked from the under side of the sector either by automatic means or by a workman within the chamber 62. The material may be scraped from the table 72 into any desired receptacle, or may be packaged within the cooling chamber by being scraped directly into a can 74, which may be sealed within the chamber 62 ready for shipment. The sectors may be turned over individually, or a few at a time, and the table moved under first one and then another to receive the hardened material therefrom as desired.

In Fig. 5 there is shown a drying tower utilizing a belt as the deposit floor and arranged for the packaging of material in a cooling chamber beneath the tower and for the collection of such material as tends to move toward the side walls beneath the bottom of the tower proper. In this figure the tower is shown at 75 as supported on a square base 76 by means of brackets 77. The lower end of the tower proper extends downwardly within the base. At a point spaced sufficiently beneath the tower so that material falling thereon will not be scorched, there is disposed a wide continuous belt 78, which may be composed of canvas or any suitable material. This belt is arranged to be slowly moved to carry the material deposited thereon underneath the same into a cooling chamber 79 within the base 76. An exhaust casing 80 closes the space surrounding the tower above the base 76. From the exhaust casing a plurality of pipes 81 leads to a suction fan 82. In order to protect the inner walls of the base there are provided four wide belts 83 of canvas or other suitable material adapted to move slowly about upper and lower rolls so as to provide vertical deposit surfaces at the inner walls of the base 76 above the belt 78. The belts 83 extend sufficiently below the belt 78 so that the material deposited thereon can be properly hardened within the chamber 79. The material received by the belt 78 is carried along its under side and exposed to the dry, cooling air in the chamber 79 long enough to harden it, and is then removed by a scraper bar 84. Scraper bars 85 are provided to remove the material from the sheets 83. Beneath the scraper bar 84 is a collection trough 86, and beneath each scraper bar 85 is a collection trough 87. The collection troughs 86 and 87 are each composed of a plurality of collection units 88, each provided with a discharge spout 89, and beneath each spout 89 there is disposed a container 90 for receiving the powdered material. Each collection trough is disposed in the present instance sufficiently below its respective scraper bar to permit access to its top by a man standing within the cooling chamber 79. Dry cooling air is admitted to the chamber 79 through the conduit 91. Apparatus such as shown in Fig. 3 may be utilized for conditioning the air.

Falling particles are collected by the belts 78 and 83 and are carried thereby into the cooling chamber. The rate of movement of the belts 83 may be considerably slower than the rate of movement of the belt 78 because of the relatively small number of particles deposited thereon. After the material has remained in the cooling chamber 79 long enough to be fully hardened, it is scraped from the belts into the troughs 86 and 87 by means of the scraper bars, and will fall into one or another of the cans 90. If the material scraped off should be in too large pieces to fall readily through the spouts 89, the pieces retained in the trough may be crumbled, as by a workman, with a paddle, or automatically, from time to time. As a can becomes filled it may be closed by the workman and removed from the chamber 79.

In instances where it is desired to avoid constructional difficulties by extending the tower walls directly down to the floor, as in Fig. 1, but where it is desired to collect such particles as may wander through the outlet parts, there may be utilized apparatus such as shown in Figs. 6, 7, and 8. The construction may in general be the same as that shown in Fig. 1, and may include a tower 10a, a bottom floor composed of sectors 16, a cooling chamber 32, and an air inlet conduit 33. The tower is provided with exhaust ports 27a at points well spaced above the deposit floor. These exhaust ports lead into an exhaust and collection compartment 92 having exhaust pipes 93 at its upper end. On a line with the bottom of each exhaust port there is provided a reversible deposit floor member 94 centrally pivoted at 95 and preferably composed of spaced sheets of canvas or of other suitable material. Beneath the members 94 is provided an annular cooling chamber 96 in which there is mounted a collection table 97 movable on tracks 98 and carrying a container 99 for the reception of material. A branch 100 coming from the conditioned air conduit 33 communicates with the chamber 96 to introduce dry cooling air therein. If desired, the chambers 96 and 32 may be connected by openings 101, as shown in Fig. 8. As will be seen, the collection members 94 may be readily rotated by a workman within the chamber 96 at any time that they received any considerable deposit, and after this deposit has been exposed to the conditioned air in the chamber 96 it may be knocked off and collected on the table 97.

In Figs. 9 and 10 there is shown an arrangement wherein travelling belts provide deposit surfaces which prevent the collection of particles both upon the side walls of the base beneath the outlet openings and upon points adjacent the bottom of these openings. This construction comprises a cylindrical tower 102 having openings 103 for the withdrawal of used air, and a deposit floor comprising spaced reversible sectors 104 which, in the present instance, are formed with straight outer ends along lines spaced inwardly from the walls of the circular base of the tower. Beneath the sectors is a cooling chamber 105 into which a draft of conditioned air is introduced through a conduit 106. Beyond each sector there is provided a belt 107 formed of canvas or other suitable material. Each belt extends upwardly from a roll 108 at a point just behind the edge of each sector to a roll 109, thence outwardly from the roll 109 over the bottom of the outlet opening to a roll 110, thence downwardly, and preferably inwardly, to a roll 111, and thence inwardly to the roll 108. The roll 110 is adjacent the outer wall of a casing 112 providing a compartment 113. The upper ends of the compartments 113 communicate with an annular chamber 114 from which exhaust ducts 115 lead. The lower end of each compartment is provided with an opening, as shown at 116, into the cooling chamber 105. Each belt thus serves to divide its compartment 113 into an upper exhaust portion and a lower cooling chamber 117. In each cooling chamber 117 there is provided a scraper roll 119 for removing the material after it has had an opportunity to harden due to exposure to the conditioned air in the cooling chamber. Beneath each roll there is provided a trough 119a which may be similar to the trough 87 shown in Fig. 5, and which may have disposed thereunder cans 120 for the reception of the deposited material. Each compartment may be provided with a door 120a.

In certain cases, as, for example, in the handling of materials which are especially sensitive to heat, or in the use of sectors under conditions where the upward movement of air from the cooling chamber is limited, it is desirable to introduce dry cooling air interiorly of the spaced walls of a deposit floor. It is also desirable in some cases to introduce the hot air into the top of the tower in such a manner as to assist in the downward movement of the particles so as to minimize the tendency of the particles to adhere to the wall.

In Fig. 11 there is shown an apparatus exemplifying features of construction for accomplishing each of the purposes indicated. The exemplified apparatus comprises a drying tower 121 extending inwardly of a supporting base 122 which carries brackets 123 for supporting the drying tower. A casing 124 encloses the space above the supporting base. Conduits 125 lead from the top of this casing to a suction blower 126 for removing the spent air. Beneath the tower and within the base 122 there are provided reversible sectors 127 composed of spaced sheets 128 of porous material, such as canvas. These sheets are carried by means of a framework 129 on pipes 130 which are pivotally mounted in a central post 131 and in the supporting base 122. The pipes are open at their inner ends and are perforated throughout their length, as indicated at 132. The post 131 is hollow and is connected by means of a duct 133 to an air inlet conduit 134. An additional duct 135 from this conduit leads directly into the cooling chamber 136 beneath the deposit floor. As will be seen, conditioned air passes into the chamber 136 through the duct 135 and into the space between the walls of the sectors through the duct 133, the hollow post 131 and the pipes 130. There is accordingly a marked tendency for the dry cooling gas to work up through the top walls of the sector into the material being deposited so as to harden the same to a considerable extent before the reversing of the sectors, thus expediting the operation. The construction also assures penetration of sufficient conditioned gas into the space above the sectors so as to protect the deposited material fully from the heat of the tower.

The apparatus shown in Fig. 11 also includes a particularly effective type of means for counteracting the tendency of the sprayed particles to work toward, and become deposited on, the sides of the tower. A construction such as shown in Fig. 1 has such an effect, but where a still greater effect is desirable the present construction may be utilized. This construction also includes means for controlling the air inlet in a particularly desirable manner. As shown, the top of the tower is provided with a partition 137 providing, in co-operation with the top of the tower, an air inlet chamber or chamber-like duct 137a, which serves a purpose similar to the chamber-like duct 25 shown in Fig. 1. A centrifugal spray-head 138 extends through an opening 138a in the center of the partition, and the opening is sufficiently larger than the spray-head so as to permit a considerable air flow about the same. The flow opening may be unitary or may be composed of a plurality of ports separated by bracing means. Heated drying air is admitted to the chamber 137a by means of a pipe 138b. By this means a considerable flow of heated drying gas passes the spray-head in a downward direction so as to alter the course of the centrifugally-ejected particles and to counteract in a particularly effective manner their tendency to move toward the walls. In order to prevent too great a blast of air from passing through the opening 138a and to cause a diffusion of the air flow when desired, the partition 137 is formed, in the present instance, with a plurality of additional openings 139, each provided with sliding valves 139a. By a suitable regulation of the valves 139a, the speed of air flow through the opening 138a may be readily controlled so as to give exactly the right directional course to the particles of the particular material to be sprayed. The valves may be maintained closed if desired.

In certain instances, it is desirable to insulate the interior of the tower, and to this end there may be provided a construction such as shown in Fig. 12. This construction includes a tower 140 having a spray head 141 at its upper end and arranged for the introduction of heated gas through an annular duct 142 and over a baffle 143. Interiorly of the side walls of the tower there is provided a canvas sheet 144; and the side walls of the tower are formed with openings 145 to admit cooling air to the space between the wall and the canvas sheet. This air penetrates the canvas sheet and serves to protect against scorching material deposited thereon. Beneath the tower there is provided a deposit floor composed of reversible sectors 146. Each sector comprises spaced sheets 147 of porous material, such as canvas, and is pivotally mounted in a hollow post 148 by means of pipe portions 149. The post forms a part of a duct 150 leading from a conduit 151 for conditioned air. A door 152 is provided to permit access to the space beneath the sectors and to provide for the escape of air from this space, if desired. At a point above the deposit floor there are provided a plurality of exhaust openings 153 leading to an annular compartment 154 from which the spent air may be exhausted through a conduit 155. The walls of the compartment 154 may be composed of spaced sheets of canvas 156 which will serve to admit air to retard the charring of any material which will work out through the openings 153. Inside the compartment and adjacent the exhaust openings there is provided a baffle 157 which likewise may be composed of spaced sheets of canvas.

It will thus be seen that there may be provided in accordance with the invention apparatus whereby materials which are exceedingly difficult to dry may be effectively converted into powder form in a highly efficient manner.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Drying apparatus comprising a drying tower, means to disseminate material to be dried in said tower, means to heat said material to dry it in said tower, means to remove moisture-laden gases from said tower, a deposit floor beneath said removing means and adjacent the base of said tower, the cross-sectional area of the tower next above said floor and the cross-sectional area of said floor being not substantially less than the maximum cross-sectional area of said tower, and means providing a cooling chamber, said deposit floor being movable to carry the deposited material into said cooling chamber without disturbing the lie of the material.

2. Drying apparatus comprising a drying tower, means to disseminate material to be dried in said tower, means to introduce a heated drying gas adjacent the top of the tower, a deposit floor, the cross-sectional area of the tower next above said floor and the cross-sectional area of said floor being not substantially less than the cross-sectional area of said tower, means for the removal of the drying gas above said floor, and means providing a cooling chamber into which said floor may carry defrosted material for hardening said material to permit the removal thereof as a powder, said deposit floor being movable to carry the deposited material into said cooling chamber without disturbing the lie of the material.

3. Drying apparatus comprising a drying tower, means to disseminate material to be dried in said tower, means to introduce a heated drying gas adjacent the top of the tower, a deposit floor, the cross-sectional area of the tower next above said floor and the cross-sectional area of said floor being not substantially less than the cross-sectional area of said tower, means for the removal of the drying gas above said floor, means providing a cooling chamber into which said floor may carry deposited material for hardening said material to permit the removal thereof as a powder, said deposit floor being movable to carry the deposited material into said cooling chamber without disturbing the lie of the material, and means to introduce a flow of dry cooling gas into said cooling chamber.

4. Drying apparatus, comprising a drying tower, means to disseminate material to be dried in said tower, means to introduce heated drying gas into said tower, a deposit floor, the cross-sectional area of the tower next above said floor and the cross-sectional area of said floor being not substantially less than the cross-sectional area of said tower, means above the deposit floor to remove moisture-laden gases from said tower, a cooling chamber into which said floor may carry deposited material for hardening said material to permit removal thereof as powder, said deposit floor being movable to carry the deposited material into said cooling chamber without disturbing the lie of the material, and means for receiving material from said deposit floor and delivering it to a container disposed within said cooling chamber.

5. Drying apparatus comprising a drying tower, means to disseminate material to be dried in said tower, means to introduce heated drying gas adjacent the top of the tower, a deposit floor composed of a plurality of reversible sectors, means for the removal of the drying gas above said floor, and means including said sectors providing a cooling chamber beneath said floor.

6. Drying apparatus comprising a drying tower, means to disseminate material to be dried in said tower, means to introduce heated drying gas adjacent the top of the tower, a deposit floor composed of a plurality of reversible sectors, means for the removal of the drying gas above said floor, and means including said sectors providing a cooling chamber beneath said floor, each sector having at its outer end an upwardly-extending flap and a downwardly-extending flap whereby particles tending to move outwardly above said sector will be deposited on that flap which extends upwardly from the sector.

7. Drying apparatus comprising a drying tower, means to disseminate material to be dried in said tower, means to introduce a heated drying gas adjacent the top of the tower, means providing a cooling chamber, a travelling belt providing a deposit floor beneath said tower and extending into said cooling chamber, means for the removal of the drying gas above said belt, said cooling chamber being disposed to one side of said tower and being provided with small openings for the passage of said belt, and means for maintaining a relatively high pressure within said cooling chamber so as to cause a continuous flow of gas therefrom through said openings.

8. Drying apparatus comprising a drying tower, means to disseminate material to be dried in said tower, means to introduce heated drying gas into said tower, a continuous belt providing a deposit floor beneath said tower, the cross-sectional area of the tower next above said floor and the cross-sectional area of said floor being not substantially less than the maximum cross-sectional area of said tower, means above the deposit floor to remove moisture-laden gases from said tower and means including said belt for confining a dry cooling gas in a space adjacent a lower run of said belt.

9. Drying apparatus comprising a drying tower, means to disseminate material to be dried in said tower, means to remove moisture-laden gases from the sides of the tower adjacent its base, a deposit floor arranged to receive particles dried in said tower, a cooling chamber, said deposit floor being movable to carry the deposited material into said cooling chamber without disturbing the lie of the material, and movable deposit means for intercepting particles tending to move outwardly above said deposit floor and arranged for movement to carry the material deposited thereon into said cooling chamber without disturbing the lie of the material.

10. Drying apparatus comprising a spray tower structure including side walls toward which there is a tendency for particles to move, and movable deposit means disposed interiorly of said walls and arranged to intercept said particles and to carry them away from the drying heat within said tower.

11. Drying apparatus comprising a drying tower, means to disseminate material to be dried in said tower, means to introduce heated drying gas into said tower, a deposit floor for receiving downwardly-moving material dried in said tower, exhaust means above said deposit floor, and deposit means adapted to receive particles flowing outwardly with the exhaust gas as it moves toward said exhaust means, said deposit floor and said deposit means being movable to carry the deposited material into a cooling atmosphere whereby the material is conditioned for removal as a powder from the deposit floor and the deposit means respectively.

12. Apparatus for the drying of hygroscopic material of the type which is rendered adherent by heat, which comprises a drying chamber, means adjacent the top of the chamber for spraying the material to be dried, means to introduce a heated drying gas adjacent the top of the chamber, means to withdraw the heated gas at a point above the bottom of the chamber, and reversible floor means for said chamber comprising spaced layers of porous non-conducting material.

13. Apparatus for the drying of hygroscopic material of the type which is rendered adherent by heat, which comprises a drying chamber, means adjacent the top of the chamber for spraying the material to be dried, means to introduce a heated drying gas adjacent the top of the chamber, means to withdraw the heated gas at a point above the bottom of the chamber, reversible floor means for said chamber comprising spaced layers of porous nonconducting material, and means to introduce a cooling gas between said layers.

14. Drying apparatus comprising a drying tower, means to disseminate material to be dried in said tower, means to introduce a heated drying gas adjacent the top of said tower, means providing a deposit floor, the side walls of said tower terminating above said deposit floor to permit the escape of moisture-laden gases, said deposit floor extending outwardly under the sides of said tower, and means providing a cooling chamber, said deposit floor being movable to carry the deposited material into said cooling chamber without disturbing the lie of the material.

15. Drying apparatus comprising a drying tower, means to disseminate material to be dried in said tower, means to introduce a heated drying gas adjacent the top of said tower, means providing a deposit floor, the side walls of said tower terminating above said deposit floor to permit the escape of moisture-laden gases, a surrounding wall providing a cooling chamber under said deposit floor and providing a support for said tower, said deposit floor being movable to carry the deposited material into said cooling chamber without disturbing the lie of the material.

16. Drying apparatus comprising a drying tower, spray ejecting means centrally located in the top of said tower, means providing a chamber-like duct above said spray ejecting means, means for the introduction of heated drying gas into said duct, said duct being formed with an opening from which air may flow about said ejecting means and in a downward direction past the same, a deposit floor, means for the removal of the drying gas above said floor, means providing a cooling chamber, and means to introduce a dry cooling gas into said chamber, said deposit floor being movable to carry the deposited material into said cooling chamber without disturbing the lie of the material.

17. In a drying tower for drying carbohydrate material containing sugars or other hygroscopic agents, the combination with a substantially cylindrical wall having a top member provided with an opening, of spraying means disposed in said opening, non-conducting sheeting of relatively fine mesh disposed in spaced relation about the interior of said wall, a bottom member of material similar to said sheeting disposed in said tower so as to divide the same into an upper drying chamber and a lower base chamber, means for introducing a highly heated body of air into said drying chamber, means for withdrawing said heated air disposed to communicate with said drying chamber at a point remote from said introducing means and above said bottom member, means for introducing atmospheric air through the wall of said tower to the space between the wall and said sheeting, said bottom member comprising pivoted frames forming sectors arranged side-by-side and adapted to be swung open to permit successive removal of the dried particles, and means in said base chamber for supplying conditioned air to said bottom member whereby the same may percolate into said drying chamber.

18. In a drying tower for drying carbohydrate material containing sugars or other hygroscopic agents, the combination with a substantially cylindrical wall having a top member provided with an opening, of spraying means disposed in said opening, non-conducting sheeting of relatively fine mesh disposed in spaced relation about the interior of said wall, a bottom member of material similar to said sheeting disposed in said tower so as to divide the same into an upper drying chamber and a lower base chamber, means for introducing a highly heated body of air into said drying chamber, means for withdrawing said heated air disposed to communicate with said drying chamber at a point remote from said introducing means and above said bottom member, means for introducing atmospheric air through the wall of said tower to the space between the wall and said sheeting, an air-distributing head disposed in said base chamber centrally of said bottom member, said bottom member comprising a plurality of double-faced sectors pivoted in said distributing head and adapted to receive a supply of air therefrom between said faces, and means for supplying conditioned air to said head; said sectors being arranged side-by-side and adapted to be opened successively whereby the dried particles may be continuously removed during the continuous operation of the drying tower.

19. Drying apparatus comprising a drying tower, means to disseminate material to be dried in the said tower, a deposit floor upon which all of the disseminated material is adapted to directly fall, means to withdraw moisture-laden gases at a point above the said deposit floor, means to confine dry cooling air beneath the deposit floor for chilling the deposit floor below hardening temperature of the material deposited thereon, the said deposit floor being movable to carry the deposited material into the dry cooling atmosphere, means to direct a current of air within the confining means, and means to convert the said air into a condition wherein it has a low relative humidity.

20. Drying apparatus comprising a drying tower, means to disseminate material to be dried in the said tower, means to introduce a heated drying gas adjacent to the top of the tower, means providing a cooling chamber, traveling belt means extending beneath the full width of the tower and providing a deposit floor beneath the tower for the reception of particles moving downwardly in any part of the lateral interior of the tower, and extending into the cooling chamber, means to confine dry cooling air in the cooling chamber whereby the particles carried by the belt into the cooling chamber are hardened before their contact with any element besides the belt means, and means for the removal of the drying gas above the belt.

ROBERT T. NORTHCUTT.
ANDREW LANGSTAFF JOHNSTON, Jr.